Dec. 4, 1956 P. A. NOXON ET AL 2,773,252
AUTOMATIC PILOT MONITOR
Filed Oct. 21, 1949
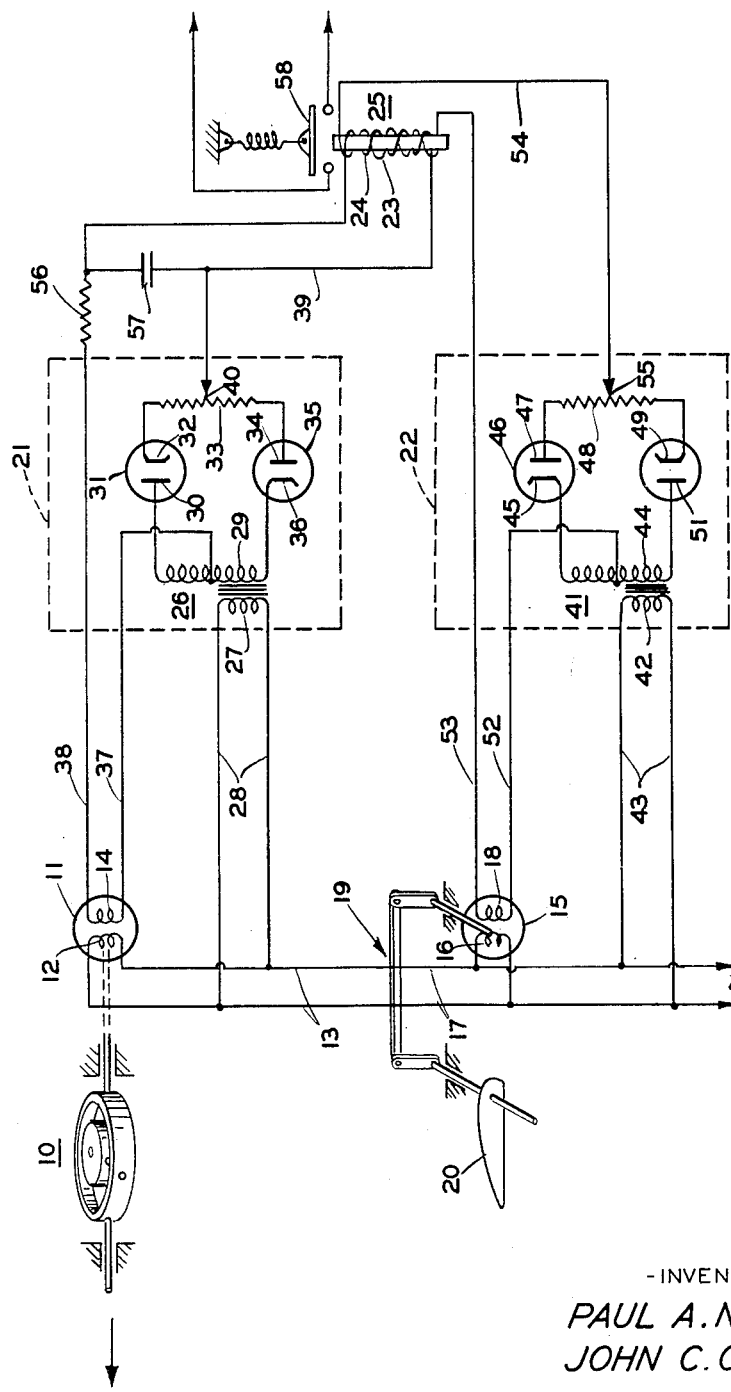
- INVENTORS -
PAUL A. NOXON
JOHN C. OWEN
BY
- ATTORNEY -

United States Patent Office 2,773,252
Patented Dec. 4, 1956

2,773,252

AUTOMATIC PILOT MONITOR

Paul A. Noxon, Tenafly, and John C. Owen, Palisades Park, N. J., assignors to Bendix Aviation Corporation, Teterboro, N. J., a corporation of Delaware Application October 21, 1949, Serial No. 122,791

7 Claims. (Cl. 340—268)

The present invention relates generally to safety or monitoring apparatus and more particularly to apparatus of this general character adapted for detecting improper control of an aircraft by an automatic pilot system.

It is well known that in any system as complicated as an automatic pilot for aircraft, failures in the system are bound to occur notwithstanding the amount of care that has been exercised in the design and testing of the system. Such failures may sometimes induce dangerous aircraft attitudes especially if the failure causes a control surface servomotor to run away. By careful design and through the use of various safety circuits embodied in an automatic pilot system many possible causes for failure may be prevented or forestalled. However, while such safety circuits are useful and serve their purpose well, they are, nevertheless, a part of the automatic pilot system itself so that such a system cannot be entirely foolproof because failures which are dangerous to the airplane may also disable, or render inactive, the safety circuits or other expedients provided in the system.

The present invention contemplates the provision of a novel and simple arrangement which is entirely independent of the automatic pilot system and is adapted for monitoring the overall pilot system and thereby recognize trouble whenever it occurs regardless of what the source of such trouble may be.

An object of the present invention, therefore, is to provide novel and automatically operable means for assuring the proper and safe operation of an aircraft by an automatic steering system provided therefor.

Another object of the present invention is to provide a novel and simple safety arrangement for monitoring the operation of an aircraft automatic pilot.

A further object is to provide a novel apparatus for monitoring the operation of an aircraft automatic pilot in which craft displacement about a given axis is compared with the amount of displacement imposed by the automatic pilot on the surface controlling the craft about that axis to return the craft to a prescribed position, an equal and opposite displacement of both the craft and the surface demonstrating proper operation of the automatic pilot.

Another and further object is to provide a novel and simple safety arrangement for monitoring the operation of an aircraft automatic pilot which is self contained and separate from as well as independent of the automatic pilot itself so that failure of any part or all of the automatic pilot will not hinder proper operation of the safety arrangement.

A still further object is to provide a novel and simple safety apparatus for monitoring the operation of an aircraft automatic pilot whereby in the event of improper pilot functioning the apparatus is operative to actuate a relay or other suitable expedient to thereby light a warning lamp, sound a warning signal, disconnect the power from the automatic pilot or the servo motors thereof, etc.

The above and other objects and advantages of the invention will appear more fully hereinafter from a consideration of the detailed description which follows when taken together with the accompanying drawing wherein one embodiment of the invention is illustrated. It is to be expressly understood, however, that the drawing is for the purpose of illustration and description only and is not designed as a definition of the limits of the invention.

The single figure of the drawing is a diagrammatic illustration of one embodiment of the novel safety apparatus of the present invention for monitoring the operation of an aircraft automatic pilot.

Aircraft automatic pilot systems currently in use rely generally on directional gyroscopes or gyro stabilized earth inductor compasses for rudder control and on gyro vertical bank and pitch pick-offs for aileron and elevator control. The rudder, aileron and elevator operating servo motors in displacing their related control surfaces also operate generators of follow-up signals which mix with the signals of their related displacement channels for servo motor control. In addition to the foregoing, trim signal generators, altitude control signal generators, etc., are utilized in the appropriate displacement channels. With automatic pilot systems of this general character, therefore, a disturbance of the craft from a straight and level flight by wind gusts, or some other force, is followed by operation of the appropriate rudder, aileron or elevator surface by the automatic pilot whereby the craft is returned to reference attitude. Under normal operating conditions, therefore, a craft change in direction or attitude is followed by a corrective surface displacement, the particular craft course or attitude change being followed by the same corrective surface movement.

By the present invention novel means are provided for comparing a craft attitude or course change with the required surface movement by the automatic pilot for determining whether or not the automatic pilot is operating properly. Generally such novel means comprise a signal generator for developing a signal which is a measure of a craft course or attitude change and a second signal generator which is a measure of the corrective craft surface displacement induced by the automatic pilot. The arrangement is of such nature that in response to proper automatic pilot operation the two signals will be substantially equal and opposite to each other but where the automatic pilot for some reason functions improperly the two signals will be of the same polarity. Warning means are associated with the two signals so as to warn the human pilot of improper pilot functioning whereby the automatic pilot may be deenergized or disconnected for manual control or whereby the automatic pilot may be automatically de-energized and/or disconnected from the control surfaces to thereby permit the human pilot to take over manual control of the craft surfaces.

Referring now to the drawing for a more detailed description of the present invention, the bank channel detector only of the novel monitoring system thereof is there shown as comprising an attitude signal generating unit such as a gyro vertical 10, for example, having an inductive bank signal generator 11, the latter including a wound rotor 12 stabilized by the gyro in the bank axis and connected by way of leads 13 to a suitable source of supply (not shown) together with an inductively coupled wound stator 14 fixed to the craft so that relative motion between the rotor and stator occurs in response to craft departure from a prescribed attitude whereby an alternating current signal appears at the stator output having a magnitude and a polarity representative of the amount and direction of craft displacement from a prescribed attitude about its roll axis.

While only the bank channel detector of the novel monitoring system hereof has been shown it will be apparent that the elevator and rudder detector channels thereof will be exactly the same with the single exception that in the rudder detector channel any suitable course change or yaw detector will be utilized in place of the gyro vertical shown. For example, a yaw rate gyro may be provided in the rudder detector channel together with some form of integration for deriving amount of displacement from the rate of displacement.

In addition to the craft attitude displacement measuring means, other means are provided for measuring the amount of corrective surface displacement induced by the automatic pilot, as a result of craft departure from a prescribed attitude, such latter means comprising an inductive pickup device 15 having a movable wound rotor 16 connected by way of leads 17 with leads 13 to be energized by a common source of supply and an inductively coupled wound stator 18 fixed to the aircraft. Rotor 16 is displaceable relative to the stator by means of a linkage system 19 operable by displacement of aileron control surface 20, the latter, as will be apparent, being displaced by an automatic pilot system (not shown) whose operation is being monitored. As a result of relative movement of the rotor and stator of inductive device 15 an alternating current signal appears at the stator output having a magnitude and a polarity representative of the amount and direction of corrective aileron displacement by the automatic pilot.

In accordance with the present invention, the signals of inductive devices 11 and 15 are converted into direct current signals, by way of suitable rectifiers generally designated with the reference characters 21 and 22, which traverse related windings 23 and 24 of a warning relay 25. The arrangement is such that for normal operation of the automatic pilot the direct current communicated to winding 23 of the relay will be equal and opposite to the direct current communicated to the winding 24 of the relay so that the effect of the two currents will be balanced and the relay will remain de-energized, while in response to improper automatic pilot operation the currents will be in the same direction in the related relay windings so that the relay will be energized to operate a warning lamp or perform any other desired function or operation.

Rectifier 21 comprises an input transformer 26 having a primary winding 27 connected by way of leads 28 to a source of reference voltage, such as that for energizing wound rotors 12 and 16, and a center tapped secondary winding 29. One end of the secondary winding connects with the plate 30 of a diode tube 31 whose cathode 32 connects through a resistor 33 with the plate 34 of a second diode tube 35 whose cathode 36, in turn, connects with the opposite end of the secondary winding. The center tap of the secondary winding, moreover, connects by way of a lead 37 with one end of stator winding 14, the other end of which connects by way of a lead 38 with one end of relay winding 23, the opposite end of the latter winding connecting by way of a lead 39 and an adjustable tap 40 with resistor 33.

Rectifier 22, on the other hand, comprises an input transformer 41 having a primary winding 42, connected by way of leads 43 to the reference voltage source, and a center tapped secondary winding 44. Primary winding 42 is connected to the reference voltage source in a reverse manner from the connection of primary winding 27 with the reference voltage source for a purpose to presently appear. One end of the secondary winding connects with the cathode 45 of a diode tube 46 whose plate 47 connects through a resistor 48 with the cathode 49 of a second diode 50 whose plate 51, in turn, connects with the opposite end of the secondary winding. The center tap of the secondary winding connects by way of a lead 52 with one end of stator winding 18, the other end of which connects by way of a lead 53 with one end of relay winding 24, the opposite end of the latter winding connecting by way of a lead 54 and an adjustable tap 55 with resistor 48.

Coming now to the operation of the novel automatic pilot monitoring system hereof, it may be assumed that the aircraft, which has an automatic pilot thereon engaged with its control surfaces, for one reason or another, banks a certain amount about its roll axis. The bank pick-off of the gyro vertical of the automatic pilot measures the amount of such roll displacement and actuates the aileron servo motor of the automatic pilot to displace aileron a corresponding amount to return the craft to a prescribed attitude about the roll axis. As the craft returns to the prescribed attitude, the bank signal diminishes so that the follow-up signal of the automatic pilot prevails to return the aileron to a neutralized position. The foregoing constitutes normal operation of the bank channel of an automatic pilot system and the novel monitoring system hereof at such time operates in a manner so that pick-off 11 of the monitoring system responds to the direction of craft displacement about its roll axis and measures the amount of such displacement whereby the input of rectifier 21 is provided with an alternating current signal whose phase and magnitude correspond to the direction and amount of craft displacement about its roll axis from a prescribed attitude.

In the absence of a signal applied to the center tap of secondary winding 29 of transformer 26 circulating currents, due to the reference voltage applied to primary winding 27, flow clockwise in the circuit defined by tube 31, resistor 33, tube 35 and secondary winding 29 in such a manner that no potential difference normally exists across the center tap of winding 29 and tap 40. As soon as the signal of pick-off 11 is applied to the center tap of secondary winding 29, however, and assuming that the input signal is of the same polarity as the upper end of secondary winding 29, it will add with the circulating currents passing from the secondary winding through tube 31 and subtract from the circulating currents passing from tube 35 to the opposite end of the secondary winding so that a difference of potential will appear across the center tap of the secondary winding and tap 40 whereupon direct current will flow in relay winding 23.

Inasmuch as some lag exists between the period of time that the signal of the bank pick-off of the automatic pilot actuates the aileron servo motor to displace aileron a similar lag is injected into the monitoring system between the signal of pick-off 11 and relay winding 23. The lag provision consists of a resistor 56 and a condenser 57 connected across relay winding 23 so that the condenser is charged before the output of the rectifier flows in the relay winding.

At the same time that pick-off 11 operates to generate a signal corresponding to the direction and amount of craft displacement from a prescribed attitude, pick-off 15 is operated in response to aileron displacement induced by the automatic pilot to generate an alternating current signal whose phase and magnitude correspond to the direction and amount of aileron displacement. Inasmuch as the surface displacement at this point is opposite to the craft displacement from the prescribed attitude, the phase of the signal of pick-off device 15 at any given interval will be opposite to the phase of the signal of pick-off device 11.

The signal of pick-off 15 is applied to the center tap of secondary winding 44 of rectifier 22, in which the primary winding 42 and tubes 46 and 50 are reversely arranged from primary winding 27 and tubes 31 and 35 of rectifier 21, so that the direct current output of rectifier 22 will be equal to but of an opposite polarity from the direct current flowing in relay winding 23 so that relay 25 will remain de-energized. As the craft returns to its prescribed attitude under the control of the automatic pilot, the signals of both pick-off 11 and 15 will diminish but remain of the same phase so that the relay will remain de-energized at all times during normal operation of the automatic pilot.

Where, on the other hand, an aircraft is maintained in its prescribed attitude by the automatic pilot system and, for one reason or another, the system becomes defective so that the aileron servomotor is caused to operate and displace aileron to place the craft in a roll attitude, the displacement of the aileron will be detected by pick-off 15 and will be in the same direction as the roll attitude induced by the automatic pilot. For this reason, the signal of pick-off 11 resulting from the displaced craft attitude while not necessarily equal in magnitude to the signal of pick-off 15 will be in phase with the signal of the latter.

As a result of the in phase condition of both signals the direct current flowing in both relay windings 23 and 24 will be of the same polarity so as to energize relay 25.

Relay 25 will, therefore, operate during abnormal function of the automatic pilot to close a circuit by way of its armature 58 to energize a warning lamp, sound a warning signal, disconnect power from the automatic pilot or its servomotors or disconnect the servomotors from their related control surfaces to permit the human pilot to take over manual control thereof.

It will now be apparent to those skilled in the art that a novel and simple arrangement for monitoring the operation of an aircraft automatic pilot has been provided which remains inactive during normal automatic pilot operation but which becomes effective during abnormal automatic pilot operation to warn the human pilot of the latter condition.

Although but a single embodiment of the present invention has been illustrated and described in detail, it is to be expressly understood that the invention is not limited thereto. Various changes can be made in the design and arrangement of parts without departing from the spirit and scope of the invention as will now be apparent to those skilled in the art. For example, while a gyro vertical with a bank pick-up has been shown for the bank detector channel of the monitoring apparatus hereof, any suitable displacement means may be applied to the rudder, aileron and elevator detector channels thereof. Moreover, any suitable rectifiers other than those shown may be utilized for converting the alternating current signals into direct current signals, the important consideration being that the relay must be wound in such a manner that for opposite relative displacement of the craft and craft surfaces the two direct currents oppose each other and for the same craft and craft surface displacements the two currents will aid each other.

We claim:

1. A safety system for an aircraft automatic pilot, the latter being adapted for operating a movable craft surface, comprising measuring means responsive to craft displacement from a prescribed position about an axis thereof for developing a signal corresponding in amount and direction to the amount and direction of craft displacement from the prescribed position, a second measuring means separate and distinct from the automatic pilot responsive to surface movement by said automatic pilot as a result of automatic pilot operation for developing a signal corresponding in amount and direction of surface movement by said automatic pilot, and monitor means connected for operation by said signals for monitoring the operation of said automatic pilot.

2. A safety system for an automatic pilot, the latter being adapted for operating a movable craft surface, comprising craft displacement measuring means responsive to changes in craft position from a prescribed reference about an axis thereof for developing a signal corresponding in amount and direction to the amount and direction of changes in craft position from the prescribed reference, surface movement measuring means separate and distinct from the automatic pilot responsive to surface movement by said automatic pilot as a result of automatic pilot operation for developing a signal corresponding in amount and direction to the amount and direction of surface movement by said automatic pilot, safety means for monitoring the operation of said automatic pilot rendered ineffective by normal automatic pilot operation and effective by abnormal automatic pilot operation, and connecting means for connecting said safety means with both of said signal developing means whereby said signals act in opposed relation during normal automatic pilot operation and in aiding relation during abnormal automatic pilot operation.

3. A safety system for an automatic pilot, the latter being adapted for operating a movable craft surface, comprising means responsive to craft displacement from a prescribed position about an axis thereof for developing a signal corresponding in amount and direction to the amount and direction of craft displacement from the prescribed position, means responsive to surface movement by said automatic pilot as a result of automatic pilot operation for developing a signal corresponding in amount and direction to the amount and direction of surface movement by said automatic pilot, safety means for monitoring the operation of said automatic pilot connected with both of said signal developing means whereby said safety means are rendered ineffective during normal automatic pilot operation and rendered effective during abnormal automatic pilot operation, and a time delay means between said safety means and one of said signal developing means to compensate for the lag between the craft displacement and the movement of the surface by the automatic pilot in response to such displacement.

4. A safety system for an automatic pilot, the latter being adapted for operating a movable craft surface, comprising means responsive to surface movement by said automatic pilot as a result of abnormal pilot operation for developing an alternating current control signal, means responsive to craft displacement from a prescribed position about an axis thereof due to said surface displacement for developing a second alternating current control signal, means for converting said alternating current signals into direct current signals, means for monitoring the operation of said automatic pilot connected for energization by said direct current signals, and means for delaying energization of said last-named means by one of said direct current signals.

5. A safety system for an automatic pilot, the latter being adapted for operating a movable craft surface, comprising means responsive to craft displacement from a prescribed position about an axis thereof for developing an alternating current control signal, means separate and distinct from the automatic pilot responsive to surface movement by said automatic pilot as a result of automatic pilot operation for developing a second alternating current control signal, said signals being of substantially opposite phase when surface movement is opposed to craft displacement during normal automatic pilot operation and of substantially the same phase when surface movement is in the same direction as craft displacement during abnormal automatic pilot operation, and safety means connected to both of said control signals for monitoring the operation of said automatic pilot.

6. A safety system for an automatic pilot, the latter being adapted for operating a movable craft surface, comprising means responsive to craft displacement from a prescribed position about an axis thereof for developing an alternating current control signal, means separate and distinct from the automatic pilot responsive to surface movement by said automatic pilot as a result of automatic pilot operation for developing a second alternating current control signal, said signals being of substantially opposite phase when surface movement is opposed to craft displacement during normal automatic pilot operation and of substantially the same phase when surface movement is in the same direction as craft displacement during abnormal automatic pilot operation, and safety means connected to both of said signals for monitoring the operation of said automatic pilot, said safety means maintained ineffective when said signals are out of phase and rendered effective when said signals are in phase.

7. A safety system for an automatic pilot, the latter being adapted for operating a movable craft surface, comprising means responsive to craft displacement from a prescribed position about an axis thereof for developing a first control signal, means separate and distinct from the automatic pilot responsive to surface movement by said automatic pilot as a result of automatic pilot operation for developing a second control signal, said signals bearing one relation with respect to each other during normal automatic pilot operation and another relation during abnormal automatic pilot operation, and safety means for monitoring the operation of said automatic pilot rendered effective when the signals bear one relation and ineffective when the signals bear another relation.

References Cited in the file of this patent

UNITED STATES PATENTS

| | | |
|---|---|---|
| 798,236 | Usener | Aug. 29, 1905 |
| 923,511 | Greenbaum | June 1, 1909 |
| 2,389,204 | Ludi et al. | Nov. 20, 1945 |
| 2,436,341 | Weybrew | Feb. 17, 1948 |
| 2,484,374 | Cahen et al. | Oct. 11, 1949 |
| 2,487,793 | Esval et al. | Nov. 15, 1949 |